(12) United States Patent
Sugioka (10) Patent No.: US 8,690,543 B2
(45) Date of Patent: Apr. 8, 2014

(54) ENERGY CONVERSION APPARATUS

(75) Inventor: Hideyuki Sugioka, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 13/080,366

(22) Filed: Apr. 5, 2011

(65) Prior Publication Data

US 2011/0247712 A1 Oct. 13, 2011

(30) Foreign Application Priority Data

Apr. 8, 2010 (JP) ................................ 2010-089582

(51) Int. Cl.
*F04B 37/02* (2006.01)
*B01D 57/02* (2006.01)

(52) U.S. Cl.
USPC ............................................. 417/48; 204/450

(58) Field of Classification Search
USPC ................. 417/48, 50; 204/450, 454
See application file for complete search history.

(56) References Cited

U.S. PATENT DOCUMENTS

| | | | |
|---|---|---|---|
| 7,081,189 B2 | 7/2006 | Squires et al. | |
| 7,316,543 B2 * | 1/2008 | Goodson et al. | 417/50 |
| 2003/0164296 A1 | 9/2003 | Squires | |
| 2003/0206806 A1 * | 11/2003 | Paul et al. | 417/48 |
| 2004/0241004 A1 * | 12/2004 | Goodson et al. | 417/48 |

FOREIGN PATENT DOCUMENTS

JP 2002-518989 A 6/2002

OTHER PUBLICATIONS

Callegaro Luca et al, Practical Realization of Nyquist's Gedanken Experiment; Istituto Nazionale di Ricerca Metrologica, Strada delle Cacce, 91-10135 Torino, Italy—Applied Physics Letters 89, 034105 (2006).

* cited by examiner

*Primary Examiner* — Charles Freay
(74) *Attorney, Agent, or Firm* — Canon U.S.A., Inc. IP Division (57) ABSTRACT

An apparatus includes a device including a pair of electrodes and a channel producing an electro-osmotic flow or electrophoretic flow of a liquid by applying a voltage between the pair of electrodes, and an impedance connected to the pair of electrodes, wherein a voltage resulting from thermal noise is applied to the pair of electrodes by giving a temperature difference between the channel and the impedance, and thermal energy corresponding to the temperature difference is converted into a flow of the liquid, the flow of the liquid being mechanical energy.

16 Claims, 12 Drawing Sheets

ENERGY CONVERSION APPARATUS

BACKGROUND OF THE INVENTION

1. Field of the Invention

The present invention relates to an apparatus converting microscopic thermal energy into macroscopic mechanical energy using a temperature difference.

2. Description of the Related Art

A micropump using electro-osmosis is relatively simple in structure and easy to mount to a micro-channel. Therefore, the micropump is used in such fields as μTAS (Micro-Total Analysis System).

In these circumstances, attention has been recently paid to a micropump using Induced-Charge Electro Osmosis (ICEO) for the reason that the micropump can increase a flow rate of liquid, and suppress chemical reactions between electrodes and the liquid since the micropump can be driven by AC.

U.S. Pat. No. 7,081,189 discusses a micro-mixer that serves as a mixer (mixing device) using ICEO and a pump (liquid conveyance device), and that uses vortex produced by ICEO flow around a cylindrical metallic post, and a micropump using the ICEO flows.

Meanwhile, L. Callegaro and M. Pisani, Appl. Phys. Lett. 89, 034105 (2006) discusses that a temperature difference between two impedances causes electric energy deriving from thermal noise to transfer between the two impedances.

Although the mixer and the pump, discussed in the U.S. Pat. No. 7,081,189, is expected to be used in the future, each of the mixer and the pump needs a power supply applying an electric field to the cylindrical metallic post to produce the ICEO flows.

A battery, a DC power supply in place of the battery and an AC power supply is generally considered as the power supply. If it is possible to use energy different in properties from these power supplies by converting to electric energy, it is highly probable to extend the use of a fluid element.

Furthermore, if energy conversion can be made using the fluid element, the technique has the potentiality as a new energy conversion method.

On the other hand, L. Callegaro and M. Pisani, Appl. Phys. Lett. 89, 034105 (2006) fails to specifically discuss how to extract electric energy although the transfer of the electric energy between the impedances is described.

SUMMARY OF THE INVENTION

According to an aspect of the present invention, an apparatus includes a device including a pair of electrodes and a channel producing an electro-osmotic flow or electrophoretic flow of a liquid by applying a voltage between the pair of electrodes, and an impedance connected to the pair of electrodes, wherein a voltage resulting from thermal noise is applied to the pair of electrodes by giving a temperature difference between the channel and the impedance, and thermal energy corresponding to the temperature difference is converted into a flow of the liquid, the flow of the liquid being mechanical energy.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An energy conversion apparatus according to the present invention includes a liquid driving device that includes a pair of electrodes and a channel generating an electro-osmotic flow or electrophoretic flow of a fluid by applying a voltage between the paired electrodes, and an impedance connected to the paired electrodes.

The apparatus according to the present invention applies a voltage deriving from thermal noise to the paired electrodes by generating a temperature difference between the channel and the impedance, and converts thermal energy corresponding to the temperature difference into the flow of the fluid as mechanical energy.

Figure 1:
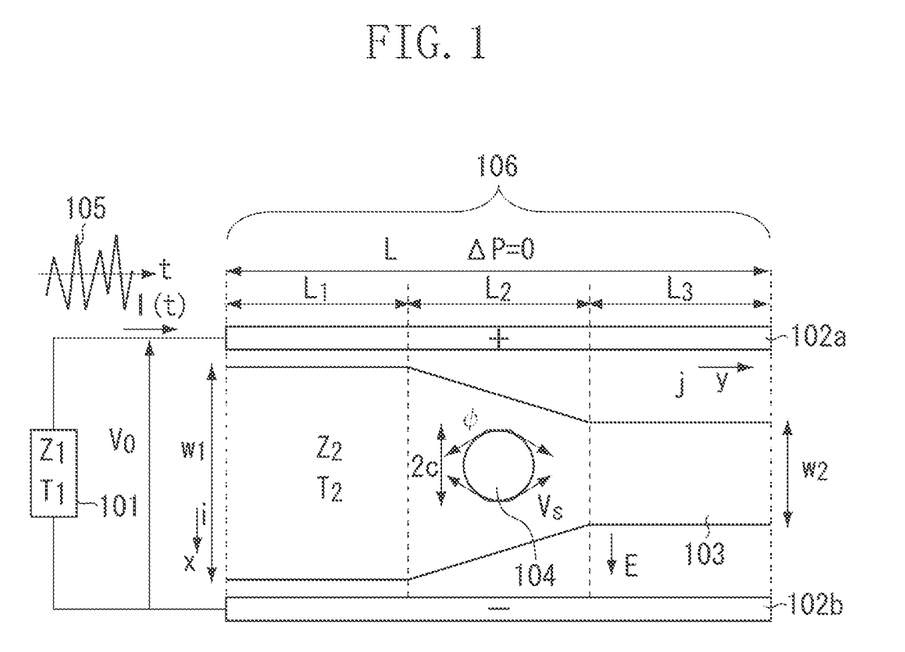
FIG. 1 is an exemplary diagram illustrating features of an energy conversion apparatus according to the present invention.

FIG. 1 is an exemplary diagram illustrating an example of the energy conversion apparatus according to the present invention.

In FIG. 1, a pair of electrodes 102a and 102b is provided to face each other, and a channel 103 produces an electro-osmotic or electrophoretic flow by applying a voltage to the electrodes 102a and 102b. The channel 103 has a length L, an inlet port width $w_1$ (=w), an outlet port width $w_2$, and a depth d (>w). The channel 103 and the paired electrodes 102a and 102b constitute a liquid driving element (fluid element).

An impedance 101 is connected in parallel to the electrodes 102a and 102b. A temperature difference $\Delta T$ ($=T_1-T_2$) is given between the channel 103 and the impedance 101, thereby applying a voltage (thermal noise voltage) resulting from thermal noise between the electrodes 102a and 102b.

In FIG. 1, the impedance 101 has an impedance value $Z_1$ and a temperature $T_1$, and the liquid driving element 106 including the channel 103 and the paired electrodes 102a and 102b has an impedance value $Z_2$ and a temperature $T_2$.

In the energy conversion apparatus illustrated in FIG. 1, a thermal noise voltage 105 (a mean voltage $V_0$) deriving from the impedance 101 is applied between the electrodes 102a and 102b using the temperature difference $\Delta T$ between the impedance 101 and the liquid driving element 106 (or actually the channel 103), thereby generating an electric field in the channel 103. This electric field induces charge onto a surface of a cylindrical conductive member 104.

Charged components (such as positive ions and negative ions) contained in the liquid are attracted to the induced charge so that an electric double layer is formed. A (quadrupole) vortex is produced by the electro-osmotic flow that occurs in the electric double layer formed to be paired with the induced charge. In the channel 103 having asymmetric shape, a net flow is produced in a channel direction by an electro-osmotic flow produced by the conductive member 104.

More specifically, the energy conversion apparatus according to the present invention can produce a net electro-osmotic flow by connecting the impedance 101 different in temperature from the channel 103 to the electrodes 102a and 102b that generate the electric field in the channel 103.

In other words, the energy conversion apparatus according to the present invention can convert microscopic thermal energy into macroscopic mechanical energy and thermal energy corresponding to a small temperature difference into mechanical energy.

In the present invention, an impedance is defined as follows. If a voltage between a pair of electrodes is E, current is I, and the voltage E and the current I are represented by a sine function in complex representation, then the impedance Z is a ratio of E to I, i.e.:

$$Z=E/I=(E_0/I_0)\exp j\phi=Z_0\exp j\phi$$

Furthermore, the impedance means a member connected to the paired electrodes 102a and 102b that causes this ratio Z=E/I.

In the equation, j denotes $\sqrt{-1}$ and $\phi$ denotes an initial phase. The impedance is formally dealt with as an equivalence to a resistance in a direct-current (DC) circuit, and generally represented by Z=R+jX. In the general formula, a real part R is resistance and an imaginary part X is reactance.

In the present invention, thermal noise means an irregular potential difference generated in a resistor since a distribution of electrons or ions that make thermal motion in the resistor is spatially and temporally non-uniform (i.e., fluctuates).

A conventional liquid driving device needs an ordinary power supply (such as a battery, a DC power supply or an AC power supply) connected to a pair of electrodes to generate a potential difference between the electrodes. The liquid driving element according to the present invention, by contrast, employs the thermal noise produced by giving the temperature difference between the channel 103 and the impedance 101 as a driving source.

Accordingly, the present invention does not contain an apparatus to which an ordinary power supply is connected and is clearly distinguished from the apparatus that needs such an ordinary power supply.

Namely, the impedance 101 connected to the paired electrodes 102a and 102b according to the present invention does not contain an impedance that an ordinary power supply includes and the power supply. A specific member that functions as the impedance can be preferably a member having such a shape and a construction material as is approximately identical in magnitude to an impedance of the liquid driving element so that the voltage deriving from thermal noise becomes larger.

The conductive member 104 is made of a material that induces charge by the electric field. Examples of the material of the conductive member 104 include carbon and carbon-based materials as well as metals (such as gold and platinum). It is to be noted, however, that the conductive member 104 can be preferably made of a material stable towards the liquid to be conveyed.

Moreover, the number of conductive members 104 provided in the channel 103 can be preferably more than one to efficiently generate a vortex and can be selected in light of a length of the channel 103, a magnitude of each conductive member 104, viscosity of the liquid to be conveyed and the like.

The conductive members 104 can be arranged at the center of the channel 103 to efficiently generate the vortex. The number of conductive members 104 can be appropriately selected.

As electrodes that apply the electric field to the conductive member, the paired electrodes 102a and 102b facing each other are provided in FIG. 1. A plurality of electrodes can be arranged on the same plane as long as charge can be efficiently induced to the conductive members 104. Examples of a material of the electrodes 102a and 102b include gold, platinum, carbon, and carbon-based conductor as well as ordinary electrode materials such as metals.

In the present invention, the impedance 101 connected to the electrodes 102a and 102b and serving as the thermal noise voltage source can be selected from among various types of impedances. A low capacitive impedance equal to or lower than 0.1 fF can be employed to make the apparatus small in size and obtain high mean thermal noise voltage.

In the present invention, the channel 103 for conveying the fluid can be made of a material normally used in such a field as µTAS. Specifically, the channel 103 can be made of a stable material towards the conveyance target liquid. Examples of the stable material include inorganic materials such as $SiO_2$ and Si and polymer resins such as fluorocarbon resin, polyimide resin and epoxy resin.

A width of the channel 103 is equal to or smaller than 1 µm, preferably equal to or smaller than 0.5 µm, more preferably equal to or smaller than 0.2 µm to generate a high electric field with low thermal noise voltage and generate a large flow. The narrower the channel 103 is, the higher the electric field in the channel 103 becomes and the higher the flow velocity becomes.

The depth of the channel 103 can be larger than the width of the channel 103 to increase a flow rate.

Specifically, a ratio of channel depth to channel width is equal to or higher than 0.2, preferably equal to or higher than 0.5, more preferably equal to or higher than 1.

In the present invention, the liquid that can be conveyed in the channel 103 is basically a liquid including polar molecules containing charged components. Examples of the liquid include water and solutions containing various types of electrolytes.

In the energy conversion apparatus according to the present invention, it is possible to adopt a means for locally making the temperature difference to give the temperature difference between the channel 103 and the impedance 101. Examples of the means include laser irradiation and injection of cooled or heated fluid.

To manufacture the energy conversion apparatus according to the present invention, a microelectromechanical system (MEMS) technique, lithographic technique or the like for normally manufacturing a fluid conveyance apparatus using a micro-channel such as μTAS can be used.

In the energy conversion apparatus according to the present invention, a real part of the impedance 101 can be set equal to that of the impedance of the liquid driving element 106.

FIG. 1 is an exemplary diagram illustrating an energy conversion apparatus according to a first exemplary embodiment of the present invention.

In FIG. 1, the energy conversion apparatus includes the paired electrodes 102a and 102b. The channel 103 produces an electro-osmotic or electrophoretic flow of liquid by applying a voltage to the electrodes 102a and 102b. The channel 103 has the length L, the inlet port width $w_1$ (=w), the outlet port width $w_2$, and the depth d (>w). The electrodes 102a and 102b and the channel 103 constitute the fluid driving element 106.

The impedance 101 is connected in parallel to the electrodes 102a and 102b. By giving the temperature difference $\Delta T(=T_1-T_2)$ between the channel 103 and the impedance 101, thermal noise voltage is applied to the electrodes 102a and 102b.

In the present exemplary embodiment, the conductive member 104 is a cylinder having a radius c (a diameter 2c). In FIG. 1, a parameter φ represents a position of a flow on the cylinder and a vertical electric field E is perpendicular to the electrodes 102a and 102b.

In FIG. 1, the cylinder or conductive member 104 is at a position $(x_b, y_b)$. The length L of the channel 103 is $L_1+L_2+L_3$, that is, L (=$L_1+L_2+L_3$), where $L_1$, $L_2$, and $L_3$ denote lengths of respective parts of the asymmetry channel 103. Further, an inlet port (left end) of the channel has the width $w_1$, and an outlet port (a right end) thereof has the width $w_2$. Each of the electrodes 102a and 102b has a width w and the width w is assumed to be equal to $w_1$ herein.

In the present exemplary embodiment, it is assumed that $(x_b, y_b)=(0.5w, 1.125w)$, L=2.25, $L_1=L_2=L_3=0.75$, $w_1=0.1$ μm, $w_2/w_1=0.4$, and c/w=0.2. Specifically, the channel 103 in the present exemplary embodiment has an asymmetric structure.

Figure 2:
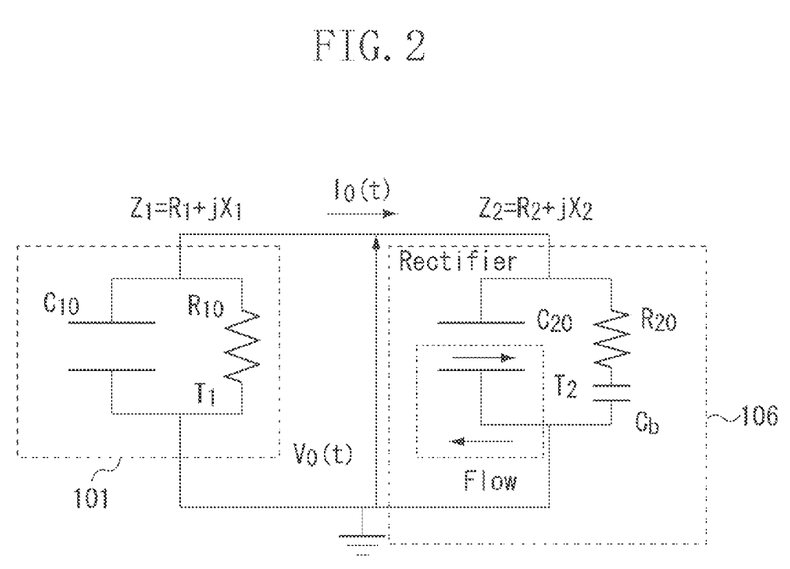
FIG. 2 is a circuit diagram illustrating an equivalent circuit of the energy conversion apparatus according to the present invention.

As illustrated in FIG. 2, a high impedance $Z_1=R_1+jX_1$ is connected to an impedance $Z_2=R_2+jX_2$, which is also high, of the liquid driving element 106.

FIG. 2 is an equivalent circuit diagram of the energy conversion apparatus according to the first exemplary embodiment illustrated in FIG. 1. In the present exemplary embodiment, the low capacitive impedance having a capacity equal to or smaller than 0.1 fF is connected between the paired electrodes 102a and 102b.

Thermal noise can thereby have a high bandwidth, making it possible to obtain a high mean thermal noise voltage.

As illustrated in FIG. 2, the impedance $Z_1$ is configured so that a high resistance component $R_{10}$ is connected in parallel to a capacity component $C_{10}$. Likewise, the impedance $Z_2$ is configured so that a high resistance component $R_{20}$ is connected in parallel to a capacity component $C_{20}$.

To be strict, the impedance $Z_2$ is considered to include a capacity component $C_b$ (=$\epsilon_2 A_2/\lambda_D$) of an electric double layer connected in series to the high resistance component $R_{20}$. However, the capacity $C_b$ is ignorable because of $C_b \gg C_{20}$.

In the capacity component $C_b$ (=$\epsilon_2 A_2/\lambda_D$), $\epsilon_2$ (nearly equal to 80$\epsilon_0$) denotes a dielectric constant of the liquid driving element 106, where $\epsilon_0$ denotes a dielectric constant in vacuum, $A_2$ denotes an electrode area of the liquid driving element 106, and $\lambda_D$ (nearly equal to 1 nm in water) denotes a debye length.

In this case, $R_i(\omega)=R_{i0}/[1+(\omega/\omega_{ci})^2]$, $X_i(\omega)=-\omega C_{i0} R_{i0}^2/[1+(\omega/\omega_{ci})^2]$, $\omega_{ci}=1/(R_{i0}C_{i0})$, and i=1, 2.

In addition, $R_{20}=w/\sigma_2 A_2$, $C_{20}=\epsilon_2 A_2/w$, and $\sigma_2$ denotes a bulk electric conductivity of the liquid driving element 106.

Similarly to L. Callegaro and M. Pisani, Appl. Phys. Lett. 89, 034105 (2006), the square of a noise voltage of $R_i$ in a frequency interval dv is denoted by $E_i^2 dv$. Energy $P_{ij}$ moving from $R_i$ to $R_j$ is expressed by the following Equation (1) based on the thermodynamic study of Nyquist.

$$P_{ij}=4kT_i R_1 R_2 dv/(R_1+R_2)^2 \quad (1)$$

In the Equation (1), $T_i$ is an absolute temperature of $R_i$ and k is the Boltzmann constant.

Therefore, similarly to L. Callegaro and M. Pisani, Appl. Phys. Lett. 89, 034105 (2006), a net quantity of electricity dP (=$P_{12}-P_{21}$) transmitted from $R_1$ to $R_2$ is expressed by the following Equation (2).

$$dP=4k\Delta T R_1 R_2 dv/(R_1+R_2)^2 \quad (2)$$

In the Equation (2), $\Delta T=T_1-T_2$. At $R_1=R_2$, maximum power transfer occurs and dP becomes maximum, that is dP=k$\Delta T$dv. Therefore, a square value of a net thermal noise voltage consumed by $R_2$ in the frequency interval dv is expressed by the following Equation (3).

$$dV_0^2=R_2 dP=R_2 4k\Delta T R_1 R_2 dv/(R_1+R_2)^2 \quad (3)$$

Particularly if $R_1$ is set equal to $R_2$ or $R_1=R_2$, (i.e., $R_{10}=R_{20}$ and $C_{10}=C_{20}$) a square value of the thermal noise voltage expressed by the Equation (4) is obtained.

$$dV_0^2=R_2 dP=R_2 k\Delta T dv=k\Delta T dv\{R_{20}/[1+(\omega/\omega_{c2})^2]\} \quad (4)$$

In the Equation (4), $R_i$ is set to satisfy $R_i \gg X_i$.

Moreover, by integrating the Equation (4) with an interval from 0 to infinity, a mean-square value of the net thermal noise voltage consumed by $Z_2$ expressed by the following Equation (5) is obtained.

$$V_{0m}^2=0.25k\Delta T R_{20}\omega_{c2}=0.25k\Delta T/C_{20} \quad (5)$$

Specifically, this voltage is substantially applied to the paired electrodes 102a and 102b of the liquid driving element 106 and a flow of a fluid is produced in the channel 103. Further, the mean thermal noise voltage $V_m$ is expressed by the following Equation (6).

$$V=[V_{0m}^2]^{0.5}=[0.25k\Delta T/C_{20}]^{0.5} \quad (6)$$

It is understood from this Equation (6) that a higher thermal noise voltage can be obtained if the given temperature difference is greater. While it is desirable that the temperature difference given in the present invention is great, the temperature difference is preferably equal to or greater than 10 K, more preferably equal to or greater than 20 K.

At this time, a typical velocity $U_0$ of a flow generated around the conductive member or metallic cylinder 104 is expressed by the following Equation (7).

$$U_0=(\epsilon_2/\mu)(c/w)(V_{0m}^2/w) \quad (7)$$

In the Equation (7), μ denotes viscosity. If the liquid flowing in the channel 103 is water, the viscosity μ is 1 mPa·s. Further, a net mean flow velocity $U_P$ by the thermal noise voltage resulting from the temperature difference $\Delta T$ is expressed by the following Equation (8).

$$U_P = \beta U_0 \qquad (8)$$

In the Equation (8), $\beta$ denotes a constant indicating a pump performance determined by the structure or the like of the liquid driving element 106.

Figure 3:
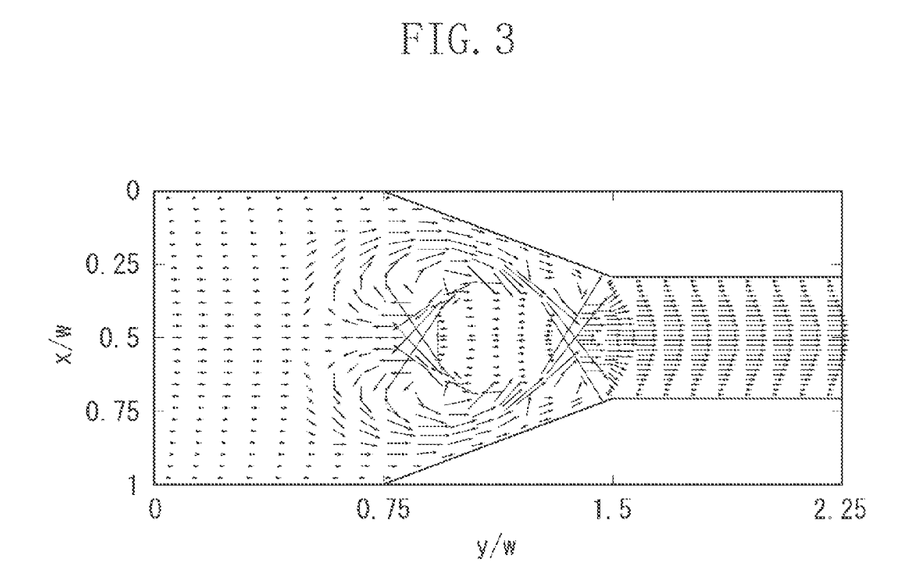
FIG. 3 illustrates a flow velocity distribution of a channel according to the first exemplary embodiment of the present invention.

FIG. 3 shows a flow velocity distribution of the fluid in the liquid driving element 106 of the energy conversion apparatus according to the present exemplary embodiment.

It is understood from FIG. 3 that a symmetric quadrupole vortex is generated around the cylindrical conductive element 104 if the channel 103 is symmetric. It is also understood therefrom that the quadrupole vortex is deformed due to the asymmetric channel 103 and a net flow is produced in a direction of the narrow channel width.

In this case, at $T_0 U_0/w = 0.08$, a mean flow velocity measured (being made nondimensional) at the inlet port of the channel 103 is $T_0 U_P/w = 0.0063$ and the pump performance constant $\beta$ is $\beta = 0.07875$ to $0.1$. $T_0$ is a time unit at the time of calculation and satisfies $T_0 = 1$ ms.

Moreover, this calculation result means that at $w = 0.1$ μm, the mean flow velocity $U_P$ satisfies $U_P = 0.63$ μm/s for an applied voltage of $V_0 = 2.38$ mV.

A calculation value is obtained by a calculation using Stokes' fluid equation in light of ICEO effect.

In the calculation, it is assumed that $c/w = 0.2$, a pressure difference $\Delta P$ between the inlet port and the outlet port of the channel 103 satisfies $\Delta P = 0 P_a$ (pressure gradient $\Delta P/L$), and $L/w = 2.25$.

Figure 4A:
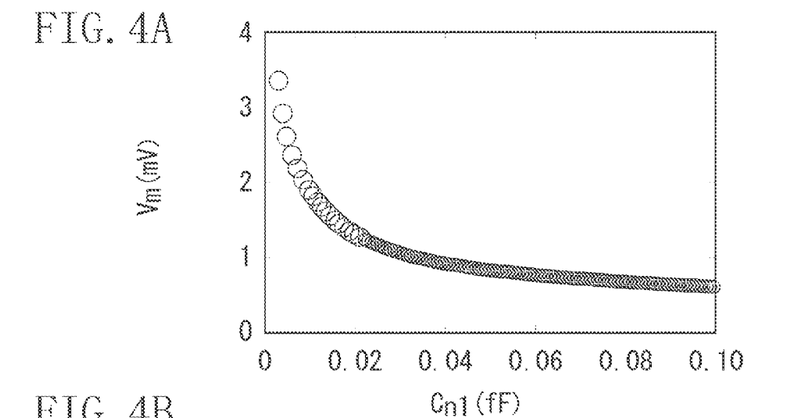
FIG. 4A is a graph illustrating capacity dependence of thermal noise voltage.

FIG. 4A is a graph illustrating of $C_{10}$ (=$C_{20}$) dependence of the mean thermal noise voltage $V_m$ when $\Delta T = 10$ K, calculated by equation 6.

It is understood from FIG. 4A that a substantial thermal noise voltage in the order of mV can be applied to the liquid driving element (ICEO pump) 106 using the ICEO even if the temperature difference $\Delta T$ is as small as about 10 K by setting $C_{10}$ to be equal to or smaller than 0.1 fF, preferably equal to or smaller than 0.02 fF.

Particularly at the depth $d = 0.5$ w and $w = 0.1$ μm, $C_{20}$ is nearly equal to $80 \in_0 Ld/w$ and, therefore, nearly equal to 0.08 fF.

Figure 4B:
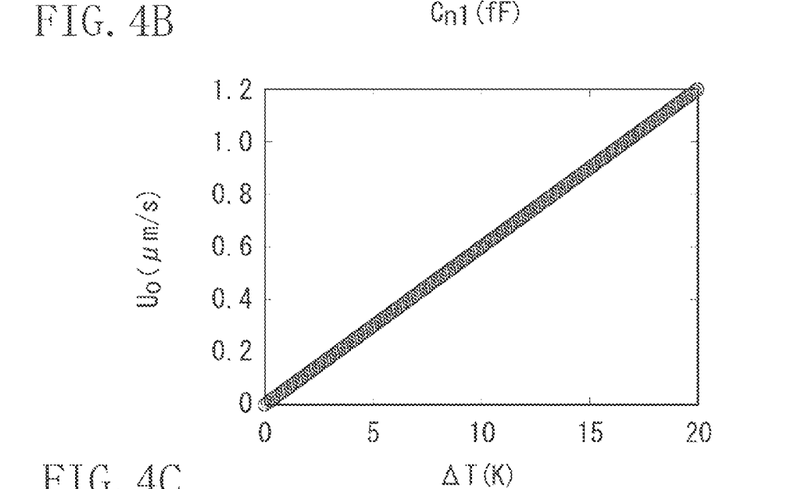
FIG. 4B is a graph illustrating a relation between a temperature difference and a typical flow velocity.

FIG. 4B is a graph illustrating calculation of temperature difference $\Delta T$ dependence of the typical flow velocity $U_0$ if $C_{20} = 0.08$ fF using the Equation (7).

It is understood from FIG. 4B that the typical flow velocity $U_0$ equal to about 1.2 μm/s can be obtained if the temperature difference $\Delta T$ is about 20 K.

Figure 4C:
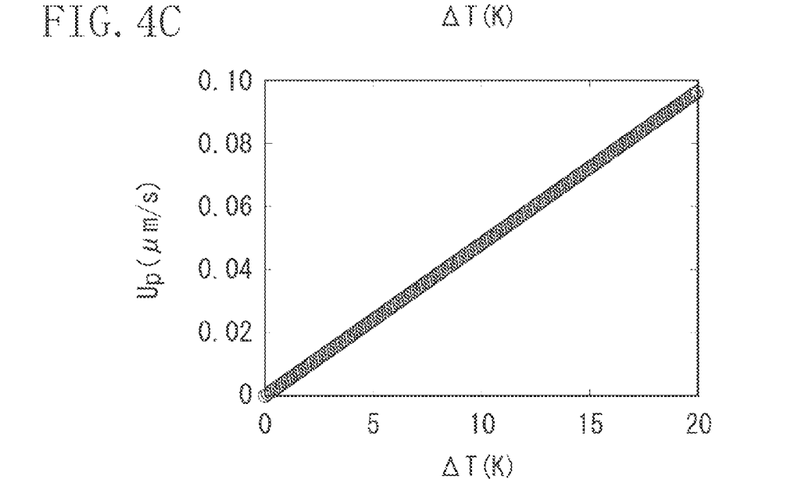
FIG. 4C is a graph illustrating a relation between a temperature difference and a mean flow velocity.

FIG. 4C is a graph illustrating temperature difference $\Delta T$ dependence of the mean flow velocity $U_P$ if $C_{20} = 0.08$ fF. It is understood from FIG. 4C that the mean flow velocity $U_0$ equal to about 0.1 μm/s can be obtained if the temperature difference $\Delta T$ is about 20 K. Specifically, it is understood that the mean flow velocity $U_0$ equal to about 0.005 μm/s can be obtained per unit temperature difference.

In this case, $R_{10} = R_{20}$ and $C_{10} = C_{20}$

Moreover, if pure water having a specific resistance $\rho = 10$ MΩ·cm is used as an electrolytic solution filled up into the liquid driving element 106, $R_{20}$ is nearly equal to 1 GΩ because $R_{20}$ is nearly equal to $\rho w/(Ld)$. In addition, $\omega_{c2} = 1/(R_{20} C_{20})$ is nearly equal to 12.5 Mrad/s.

Figure 5:
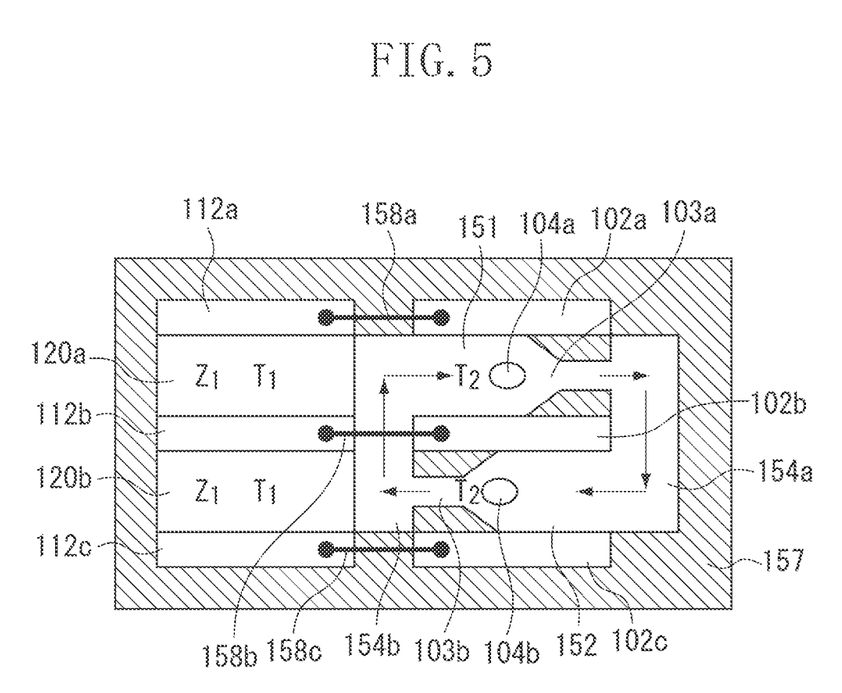
FIG. 5 is a pattern diagram illustrating an example of the energy conversion apparatus according to the present invention.

FIG. 5 is an exemplary diagram illustrating features of an energy conversion apparatus according to a second exemplary embodiment of the present invention.

The greatest difference of the energy conversion apparatus according to the second exemplary embodiment from that according to the first exemplary embodiment is that an annular channel is formed by a combination of channels producing an electro-osmotic or electro electrophoretic flow.

In FIG. 5, a first liquid driving element 151 produces a net flow in a first direction (left to right) by applying a voltage between the electrodes 102a and 102b. A second liquid driving element 152 produces a net flow in a second direction (right to left) by applying a voltage between the electrodes 102a and 102b.

An outlet port of a channel 103a of the liquid driving element 151 is connected to an inlet port of a channel 103b of the liquid driving element 152 by a connection channel 154a. An outlet port of the channel 103b of the liquid driving element 152 is connected to an inlet port of the liquid driving element 151 by a connection channel 154b. An annular channel is thereby constituted.

Furthermore, an impedance obtained by sandwiching a dielectric 120a (epoxy resin) between paired electrodes 112a and 112b is connected to the first liquid driving element 151. An impedance obtained by sandwiching a dielectric 120b (epoxy resin) between paired electrodes 112b and 112c is connected to the first liquid driving element 151.

Connection electrodes 158a, 158b, and 158c connect the impedances to the paired electrodes 112a and 112b, and the paired electrodes 112b and 112c of the first and second liquid driving elements 151 and 152. A substrate 157 is made of Si or the like and the channels 103a, 103b, 151, 152, 154a, 154b and the like are formed in the substrate 157.

In the present exemplary embodiment, heat on a high-temperature side can be transported to a low-temperature side more effectively by forming the channel producing the electro-osmotic or electrophoretic flow into an annular shape. This is because not only heat diffusion but also movement of a heat source occurs.

Figure 6:
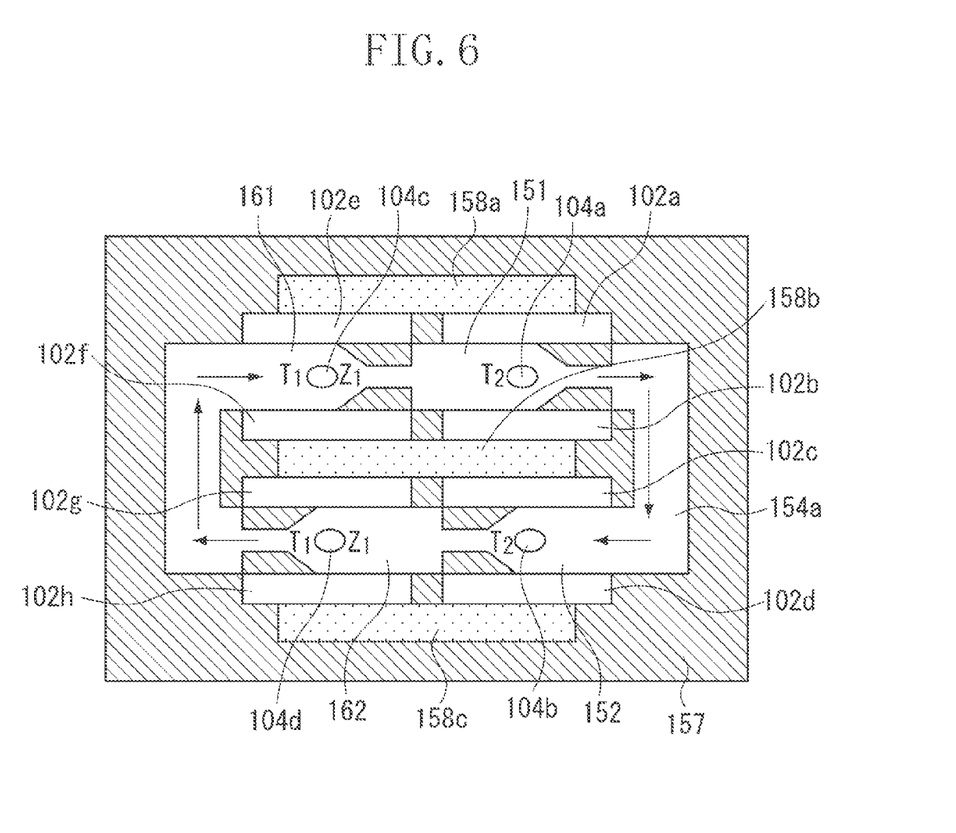
FIG. 6 is an exemplary diagram illustrating an example of the energy conversion apparatus according to the present invention.

FIG. 6 is an exemplary diagram illustrating features of an energy conversion apparatus according to a third exemplary embodiment of the present invention.

The greatest difference of the energy conversion apparatus according to the third exemplary embodiment from that according to the second exemplary embodiment is that liquid driving elements 161 and 162, which are almost identical in structure to the liquid driving elements 151 and 152, are connected to the liquid driving elements 151 and 152 as impedances, respectively.

In the energy conversion apparatus illustrated in FIG. 6, the liquid driving element 151 includes a pair of electrodes 102a and 102b, and the liquid driving element 152 includes a pair of electrodes 102c and 102d.

The liquid driving element 161 includes a pair of electrodes 102e and 102f. The liquid driving element 162 includes a pair of electrodes 102g and 102h.

The outlet port of the channel of the liquid driving element 151 is connected to the inlet port of the channel of the liquid driving element 152. Further, the channel of the liquid driving element 152 is connected to a channel of the liquid driving element 162. A loop is thereby constituted as a channel.

The electrodes 102a and 102b of the liquid driving element 151 are connected to the electrodes 102e and 102f of the liquid driving element 161 by connection electrodes 158a and 158b.

The electrodes 102c and 102d of the liquid driving element 152 are connected to the electrodes 102g and 102h of the liquid driving element 162 by connection electrodes 158b and 158c.

In the energy conversion apparatus according to the present exemplary embodiment, the liquid driving elements 161 and 162, which are almost identical in structure to the liquid driving elements 151 and 152, are used as the impedances connected to the liquid driving elements 151 and 152, respectively. It is thereby possible to satisfy a condition of $Z_1 \approx Z_2$ and to apply maximum thermal noise.

Figure 7:
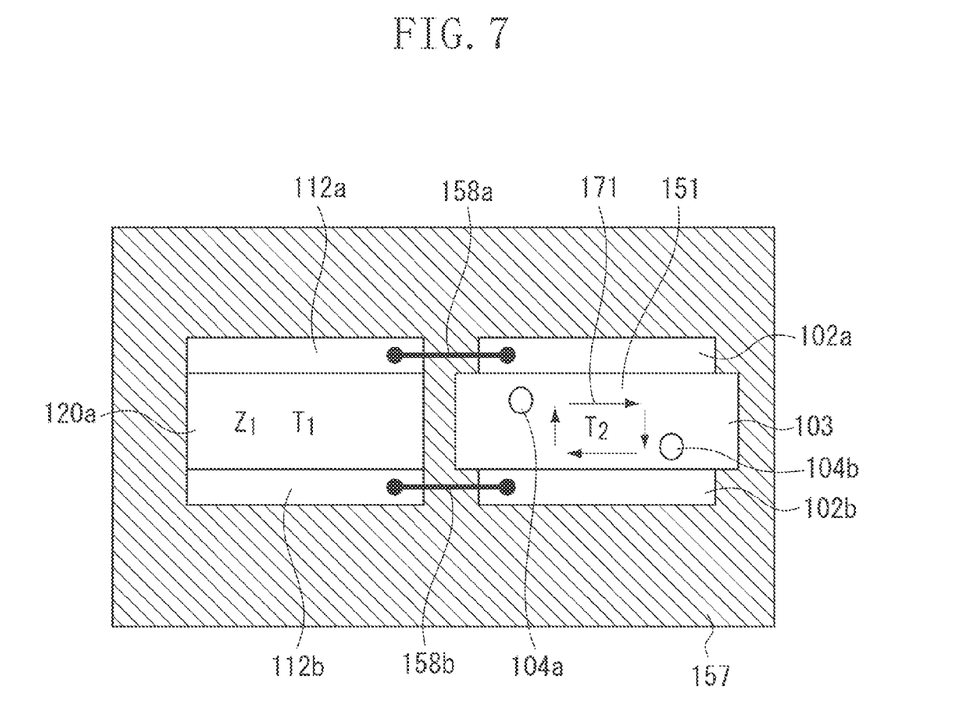
FIG. 7 is an exemplary diagram illustrating an example of the energy conversion apparatus according to the present invention.

FIG. 7 is an exemplary diagram illustrating features of an energy conversion apparatus according to a fourth exemplary embodiment of the present invention.

The energy conversion apparatus according to the present exemplary embodiment is similar to that illustrated in FIG. 5.

Differences of the energy conversion apparatus according to the present exemplary embodiment from that illustrated in FIG. 5 are as follows. The liquid driving element 152 and the impedance connected to the liquid driving element 152 are eliminated. The inlet port and the outlet port of the channel 103 are set equal in width of the channel 103. In addition, two cylindrical conductive members 104a and 104b are arranged in the channel 103.

By arranging the cylindrical conductive members 104a and 104b, it is possible to produce an eddying flow 171.

In the energy conversion apparatus according to the present exemplary embodiment, the liquid driving element 103 produces the eddying flow 171 by thermal noise voltage. It is thereby possible to apparently increase a heat diffusion rate, transport the heat on the high-temperature side to the low-temperature side more effectively, and mix up the liquid.

Figure 8:
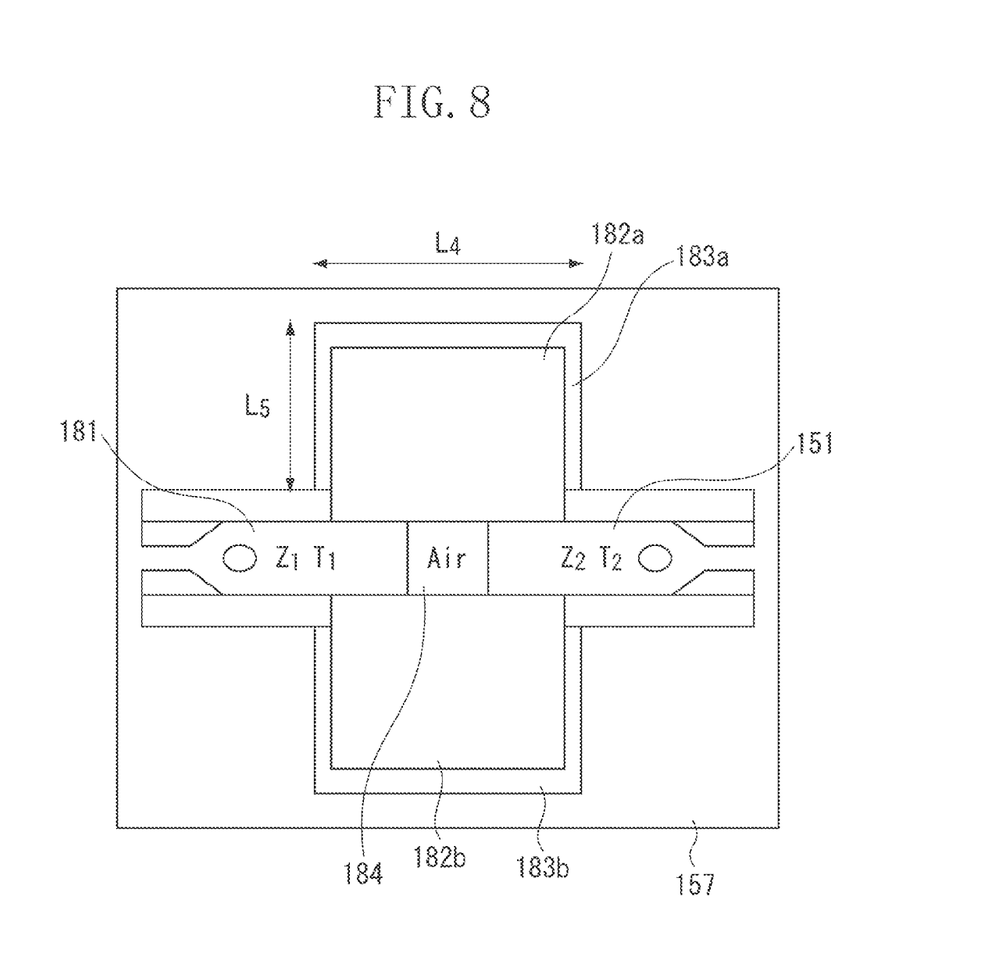
FIG. 8 is an exemplary diagram illustrating an example of the energy conversion apparatus according to the present invention.

FIG. 8 illustrates features of an energy conversion apparatus according to a fifth exemplary embodiment of the present invention.

The energy conversion apparatus according to the present exemplary embodiment differs from those according to the preceding exemplary embodiments in the following respects. Transmission paths 183a and 183b higher in resistance and smaller in capacity than the liquid driving element 151 are connected to the liquid driving element 151. In addition, an air bubble unit 184 is provided between the liquid driving element 181 connected to the liquid driving element 151 as the impedance and the liquid driving element 151.

In FIG. 8, resin materials 182a and 182b have a specific permittivity of about 3. The air bubble unit 184 is made of the resin materials 182a and 182b, and the transmission paths 183a and 183b are made of gold. In the present exemplary embodiment, $L_4 = 2$ μm, $L_5 = 1$ μm, and $d = 0.5$ w.

At this time, resistances of the transmission paths 183a and 183b are almost infinities and capacities thereof are nearly equal to $3 \in_0 d (=1.5 \in_0) \ll C_{20}$.

Specifically, the impedance can be advantageously arranged without need to consider the capacities and resistances of the transmission paths 183a and 183b by connecting the liquid driving element 151 to the impedance (liquid driving element 181) using the transmission paths 183a and 183b higher in resistance and smaller in capacity than the liquid driving element 151.

Moreover, the temperature difference $\Delta T$ can be advantageously observed as an interface moving velocity by arranging the air bubble unit 184 made of the resins 182a and 182b in the channel so that the present exemplary embodiment can be used as a temperature gradient sensor.

For example, it is possible to detect the temperature difference between the liquid driving element 151 and the liquid driving element 181 about 2 μm away from the liquid driving element 151 while irradiating the liquid driving element 181 with a laser beam.

Figure 9:
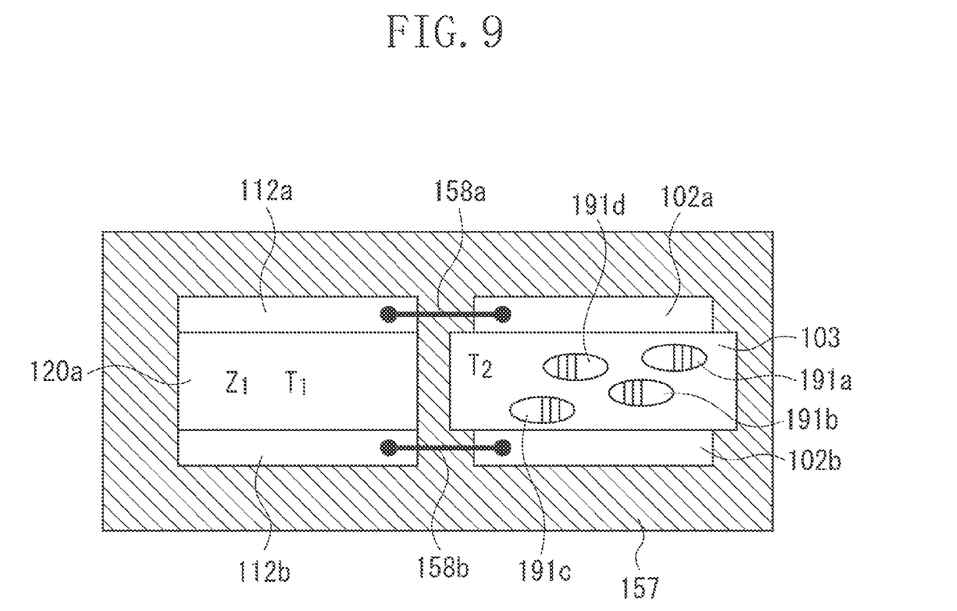
FIG. 9 is an exemplary diagram illustrating an example of the energy conversion apparatus according to the present invention.

FIG. 9 illustrates features of an energy conversion apparatus according to a sixth exemplary embodiment of the present invention.

The energy conversion apparatus according to the present exemplary embodiment is almost similar in configuration to the energy conversion apparatus according to the fourth exemplary embodiment except for arranging asymmetric conductive particles 191a to 191d without providing the two cylindrical conductive elements 104a and 104b in the channel 103.

Examples that can be used as the conductive particles 191a to 191d having asymmetry include a conductor in which a half of an elliptic conductive particle is provided with insulating layer, a quadrangular pyramid-like conductor, and a circular cone-like conductor.

These conductive particles are divided into those moving in a right direction and those moving in a left direction in the channel 103 by applying voltage to the electrodes 102a and 102b.

Left and right movement of the conductive particles 191a to 191d can increase apparent thermal diffusivity, enable the high-temperature-side heat to be actively transported to the left-temperature side, and enable the liquid to be mixed up.

Figure 10:
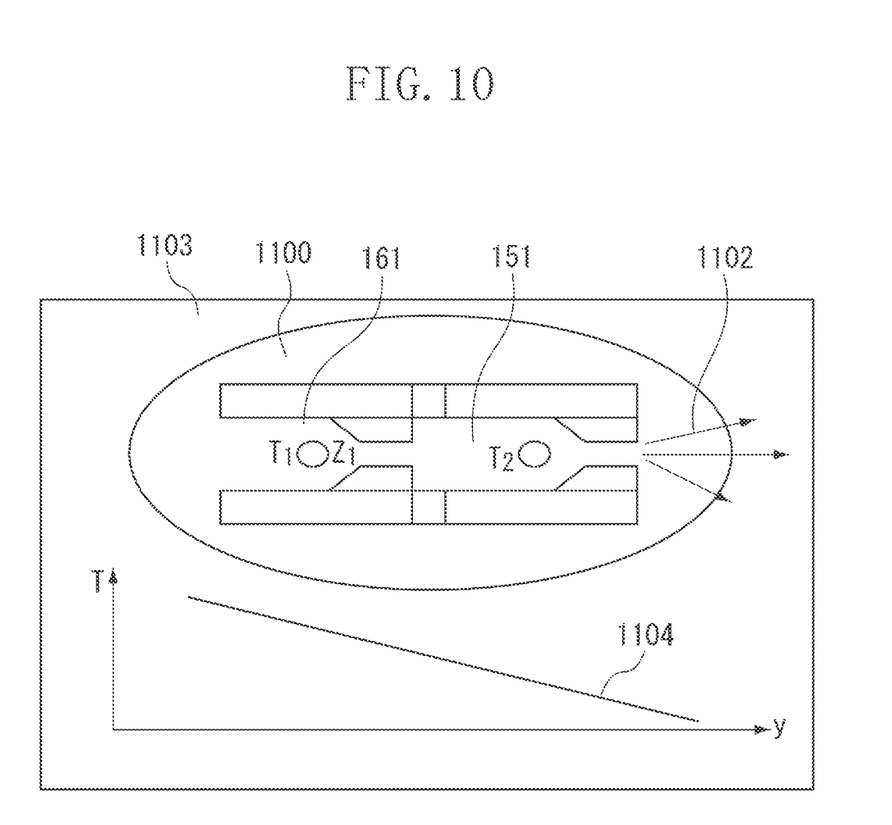
FIG. 10 is an exemplary diagram illustrating an example of the energy conversion apparatus according to the present invention.

FIG. 10 illustrates features of an energy conversion apparatus according to a seventh exemplary embodiment of the present invention.

The energy conversion apparatus according to the present exemplary embodiment is configured so that the liquid driving elements 151 and 161 are arranged on a floatable substrate 1100, so that the liquid driving element 151 can move in a fluid using a flow 1102 injected from the liquid driving element 151.

The energy conversion apparatus is filled with an electrolytic fluid 1103 such as water, and a line 1104 indicates presence of temperature gradient in the fluid 1103. Therefore, thermal noise of the liquid driving element 161 on a high-temperature side is transmitted to the liquid driving element 151 on a low-temperature side in the form of an electric signal, substantial AC voltage is generated, and the flow 1102 is injected from the low-temperature side.

The energy conversion apparatus according to the present exemplary embodiment is applicable to an artificial device that includes a function similar to taxis of an organism tending to make independent motion along the temperature gradient and to reach a heat source by injecting the flow moving from the high-temperature side to the low-temperature side, from the low-temperature side.

Figure 11:
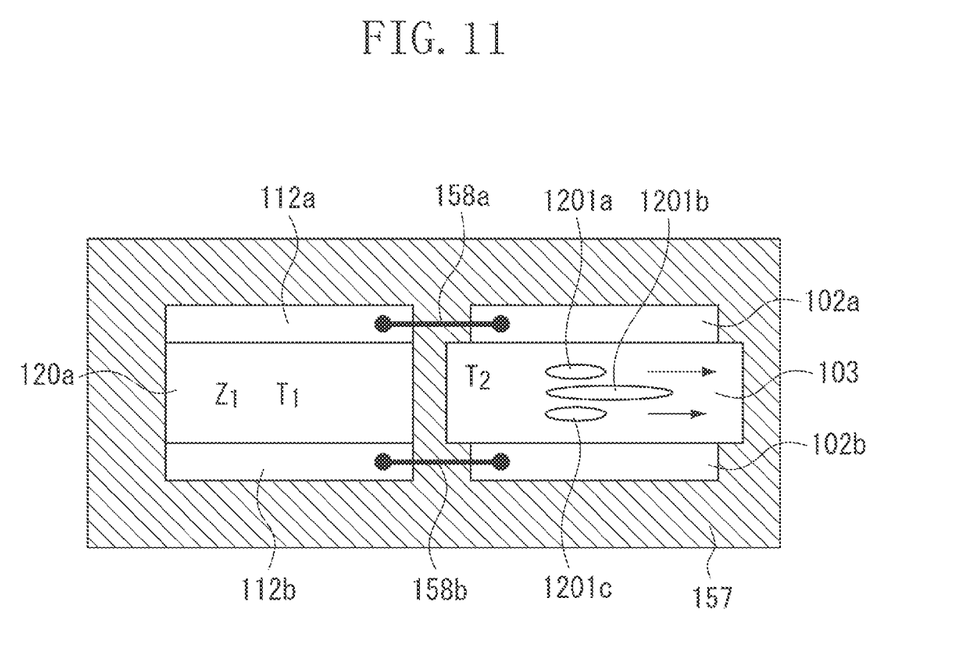
FIG. 11 is an exemplary diagram illustrating an example of the energy conversion apparatus according to the present invention.

FIG. 11 illustrates features of an energy conversion apparatus according to an eighth exemplary embodiment of the present invention.

The energy conversion apparatus according to the present exemplary embodiment is similar in configuration to that illustrated in FIG. 7 except for including conductive posts 1201a to 1201c arranged so as to get an imbalance between a forward flow and a backward flow produced by electro-osmosis.

Figure 12:
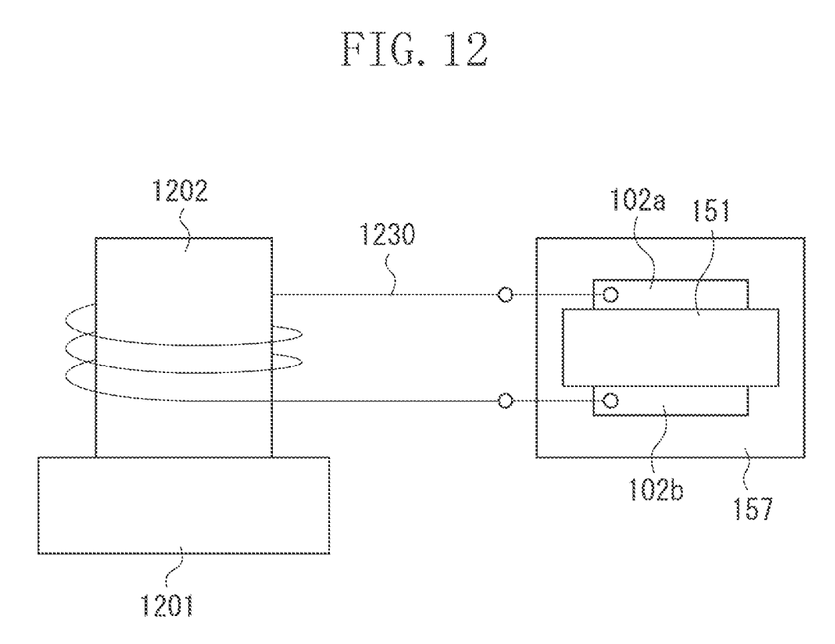
FIG. 12 is an exemplary diagram illustrating an example of the energy conversion apparatus according to the present invention.

FIG. 12 is an exemplary diagram of an energy conversion apparatus according to a ninth exemplary embodiment of the present invention. As illustrated in FIG. 12, the energy conversion apparatus according to the present exemplary embodiment includes a heater 1201, an iron block 1202, and a coil 1230. In the energy conversion apparatus illustrated in FIG. 12, the coil 1202 is connected to the electrodes 102a and 102b of the liquid driving element 151, a voltage deriving from thermal noise generated in the coil 1230 is applied to the electrodes 102a and 102b, and a fluid moves within the liquid driving element 151.

Moreover, in the present exemplary embodiment, the mean thermal noise voltage ($V_O$) is almost proportional to the number of turns N of the coil 1230. Therefore, by increasing the number of turns N, high noise voltage can be obtained and the flow velocity of the flow is made variable and accelerated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-089582 filed Apr. 8, 2010, which is hereby incorporated by reference herein in its entirety.

What is claimed is:

1. An apparatus comprising:
a device including a pair of electrodes and a channel; and
an impedance connected to the pair of electrodes,
wherein a voltage is applied between the pair of electrodes to produce an electro-osmotic flow or electrophoretic flow of a liquid in the channel,
wherein the voltage is derived from a source to create a temperature difference between the channel and the impedance, the source being generated by a laser irradiation or injection of cooled or heated fluid, and
wherein thermal energy corresponding to the temperature difference is converted into a flow of the liquid, the flow of the liquid being mechanical energy.

2. The apparatus according to claim 1, wherein the temperature difference is equal to or greater than 10 K.

3. The apparatus according to claim 1, wherein a real part of the impedance is equal to a real part of an impedance of the device.

4. The apparatus according to claim 1, wherein the channel has an asymmetric structure, and a conductive member is arranged within the channel.

5. The apparatus according to claim 1, wherein a capacitive impedance equal to or lower than 0.1 fF is connected to the pair of electrodes.

6. The apparatus according to claim 1, wherein the channel is annular.

7. The apparatus according to claim 1, wherein as the impedance, an element having a structure identical to the device is connected between the pair of electrodes.

8. The apparatus according to claim 1, wherein a conductive member is arranged within the channel, and an electric field generated by application of the voltage between the pair of electrodes generates a vortex of the liquid within the channel.

9. The apparatus according to claim 1, wherein the liquid driving element is connected to the impedance using a transmission path higher in resistance and smaller in capacity than the liquid driving element.

10. The apparatus according to claim 1, wherein the channel is arranged in a floatable substrate, and the substrate moves in the fluid using the flow of the liquid generated in the channel.

11. An apparatus comprising:
a device including a pair of electrodes and a channel; and
an impedance connected to the pair of electrodes,
wherein a voltage derived from the impedance is applied between the pair of electrodes using
a temperature difference between the channel and the impedance to generate an electric field in the channel,
wherein the electric field induces charge onto a surface to formed an electric layer; and
wherein thermal energy corresponding to the temperature difference is converted into a flow of the liquid, the flow of the liquid being mechanical energy.

12. The apparatus according to claim 11, wherein the temperature difference is equal to or greater than 10 K.

13. The apparatus according to claim 11, wherein a real part of the impedance is equal to a real part of an impedance of the device.

14. The apparatus according to claim 11, wherein the channel has an asymmetric structure, and a conductive member is arranged within the channel.

15. The apparatus according to claim 11, wherein a capacitive impedance equal to or lower than 0.1 fF is connected to the pair of electrodes.

16. The apparatus according to claim 11, wherein a conductive member is arranged within the channel, and an electric field generated by application of the voltage between the pair of electrodes generates a vortex of the liquid within the channel.

* * * * *